United States Patent [19]

Fischbach

[11] 4,127,914
[45] Dec. 5, 1978

[54] HANDLE FOR A POT

[75] Inventor: Wolfgang Fischbach, Daaden, Germany

[73] Assignee: Heinrich Baumgarten Eisen- und Blechwarenfabrik, Siegen, Germany

[21] Appl. No.: 802,415

[22] Filed: Jun. 1, 1977

[30] Foreign Application Priority Data

Jun. 1, 1976 [DE] Fed. Rep. of Germany ....... 2624478

[51] Int. Cl.² ............................................. A47J 45/06
[52] U.S. Cl. ................. 16/110 A; 16/114 A; 220/94 R
[58] Field of Search .................. 16/110 A, 114 A; 220/94 R, 96; 403/14, 291

[56] References Cited

U.S. PATENT DOCUMENTS

| | | | |
|---|---|---|---|
| 3,691,605 | 9/1972 | Witte | 16/110 A |
| 3,878,584 | 4/1975 | Witte | 16/110 A |
| 3,956,792 | 5/1976 | Fischbach | 16/114 A |
| 4,019,221 | 4/1977 | Baumgarten | 16/110 A |

*Primary Examiner*—Louis K. Rimrodt
*Attorney, Agent, or Firm*—Blanchard, Flynn, Thiel, Boutell & Tanis

[57] ABSTRACT

A handle for a pot, pan or other container which includes two plates which are welded to the container as carriers for the handle and which are located substantially in the fixing direction of the handle, each plate having two oblique edges orientated at an obtuse angle to one another, and at least one spring which, when the handle is pushed on to the handle-carrier plates, becomes tensioned by means of one of the oblique edges and which towards the end of the push-on movement, comes in behind the other edge of the carrier plate, and then presses the handle on the one hand against the container and on the other hand against the carrier plates for the handle.

11 Claims, 11 Drawing Figures

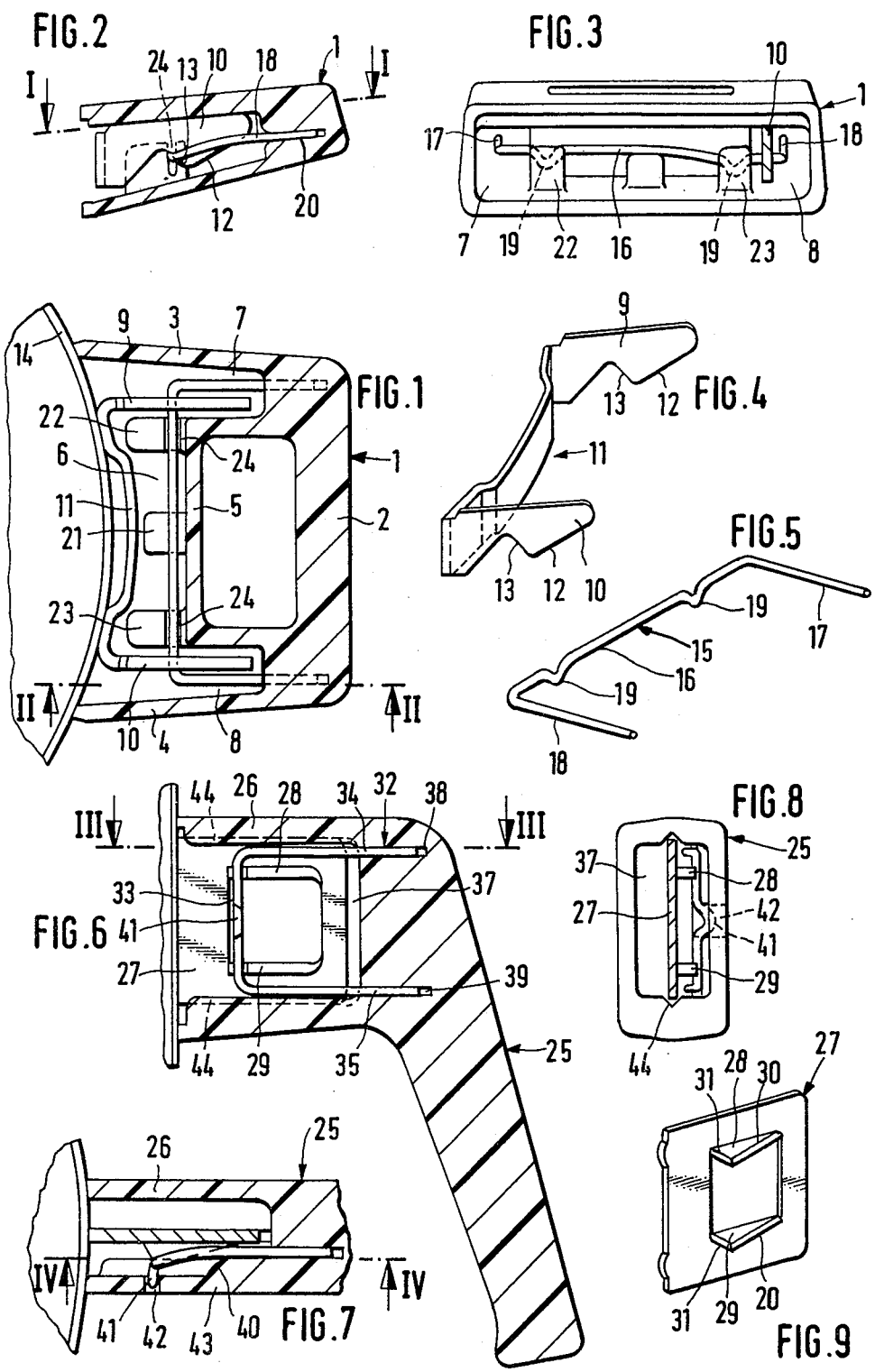

HANDLE FOR A POT

FIELD OF THE INVENTION

This invention relates to a handle construction and, more particularly, to a handle construction for a pot wherein the path of movement of the springs is increased so that the tolerances occurring when the carrier plates are welded into position influence to a small extent only the tensioning of the springs.

BACKGROUND OF THE INVENTION

In the case of one known handle of the type just described use is made, for bringing the body of the handle on to the carrier plates, of two U-shaped springs the shanks of which are directed parallel to the level of the handle itself. The bridges connecting the shanks of the springs and the ends of the shanks of the springs lie inside grooves in the handle. With this arrangement a large springing force is achieved, but the paths travelled by the springs remain limited. The result is that the tolerances occurring when the carrier plates are welded into position prevent a tensioning of the springs and the handle becomes loose.

It is an object of the present invention to provide a handle of the above-mentioned kind which permits an increase in the path travelled by the springs so that the tolerances occurring when the carrier plates are welded into position influence to a small extent only the tensioning of the springs.

This object is achieved in accordance with the invention in that the spring consists of a steel wire bent into a U-shape, the handle offering for each shank end of the spring, an anchorage which allows a full bending of the spring, when the handle is pressed on to the carrier plates, and in that in the handle there are formed one or more grooves in such a way that the bridge between the shanks of the fully-bent spring becomes engaged in the grooves and thus prevents the handle from being pulled off the springs.

With a spring according to the invention the shanks of the spring can be made long, which means that, in addition to adequate spring strengths, a sufficiently long travel for the springs is obtained. It is also possible likewise to bend the bridge of the spring fully so as to increase the work done by the spring when it is fully bent. To that end there is provided a buffer in the groove accommodating the bridge of the spring, the effect of which is to provide a support for the middle of that bridge.

The invention is intended mainly for a U-shaped container handle which has a bridge between the shanks and which also accommodates the shank of the spring. According to a further feature of the invention the bridge of the handle also serves for the attachment of lid handles and handles in the form of a shaft in straight or angle form, the spring being fitted in a radial plane of the container or, as the case may be, the lid.

BRIEF DESCRIPTION OF THE DRAWINGS

In what follows several examples of embodiment of the invention are described in greater detail by reference to the drawings in which:

FIG. 1 is a section along the line I—I in FIG. 2 through a handle according to the invention, FIG. 2 is a section taken along the line II—II in FIG. 1, FIG. 3 is a frontal view of a handle as shown in FIG. 1, FIG. 4 is a view in perspective of a carrier bridge, FIG. 5 is a view in perspective of a spring, FIGS. 6, 7 and 8 are sections or views, corresponding respectively to FIGS. 1, 2 and 3, through a shaft-type handle, FIG. 9 is a view in perspective of the carrier bridge shown in FIG. 6.

DETAILED DESCRIPTION

Figure 11:
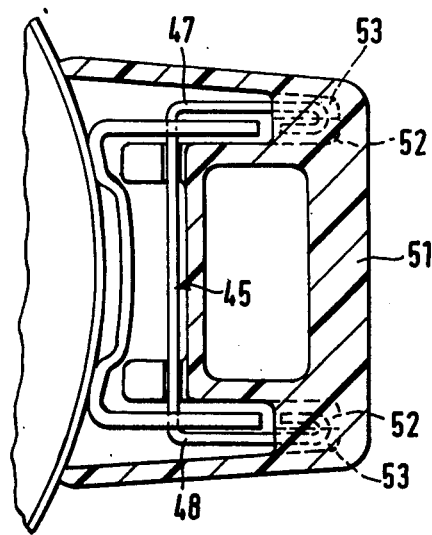
FIGS. 10 and 11 show a further embodiment of the invention.

FIG. 1 shows a U-shaped handle 1 made of plastic, with a bridge 2 and shanks 3 and 4.

The shanks are connected in the usual manner by a bridge 5. This has a recess 6 which connects recesses 7 and 8 in the shanks 3 and 4 to one another. Into these recesses protrude the carrier plates 9 and 10 for the carrier bridge 11 illustrated in FIG. 4 which is welded on to the wall 14 of a container. The plates 9 and 10 form two oblique edges 12 and 13.

In FIG. 5 the spring 15 consists of a steel wire bent into the shape of a U. The spring has a bridge 16 and two shanks 17 and 18. Bent out of the bridge 16 are projections 19. The ends of the shanks 17, 18 rest in holes 20 in the handle 1, while the bridge 16 lies inside the bridge 5 of the handle, that is to say, in its recess 6. Inside the recess 6 is a buffer 21 which serves as a support for the middle of the bridge 16 of the spring. In that same recess there are two further buffers 22, 23. In each buffer there is a groove 24. The bridge 16 of the spring 15 engages in those grooves by means of its buffers, or projections, 19 when the spring is bent during the pushing on of the handle. The grooves 24 are formed by means of studs introduced into the mould which, on the removal from the mould, are drawn out of the grooves. The grooves 24 thus form through-passages into which a tool can be introduced for extricating the spring bridge 16 which is inside the grooves. This facilitates dismantling of the handle.

As FIG. 2 shows, when the handle 1 is pushed on, the ends of the spring shanks, together with the spring 15, come up against the oblique planes 12 of the metal plates 9 and 10. This tensions the spring. Towards the end of the pushing-on movement the bridge 16 comes up against the edge 13. In that position the spring on the one hand presses the handle 1 against the upper frontal edges of the plates 9 and 10 and on the other hand presses the front edge of the handle 1 against the wall 14 of the container.

FIGS. 6, 7 and 8 show an S-shaped shaft handle 25 which is used for example on milk-cookers. The shaft is not straight as is usual, but bent by almost 90° in relation to the head 26 of the shaft. The anchorage shown of the shaft can, however, be used with any slant of the shaft.

A plate 27 welded on edge on to the container serves for the attachment of the handle. Two triangular carrier-plates 28, 29 are stamped out of the plate 27 in such a way that, looked at along the height of the container, they are one above the other. The plates, again, form oblique edges 30, 31 for tensioning a spring 32, which is U-shaped, and which has a bridge 33 and two shanks 34, 35.

The head 26 of the handle has, as is shown in FIG. 6, a recess 37 connecting with anchorages 38, 39. That recess serves to receive the shank ends 34, 35 of the spring. Curved transitional elements 40 are provided in order that the length of the spring shanks may be used to the fullest possible extent. The spring bridge 33 forms at its centre a buffer 41 which when the spring is fully bent penetrates into a through-passage 42 of the side wall 43 of the handle. The opening 37 in the head of the handle is so profiled that it forms two grooves 44 for the upper and the lower edge of the metal plate 27.

Figure 10:
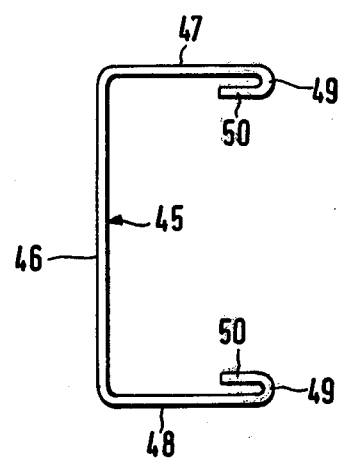

FIGS. 10 and 11 show a further embodiment of the present invention wherein the ends of the spring shanks of a spring, denoted by 45 as a whole, are stressed simultaneously by bending and torsion. Higher spring strengths can be achieved by such a construction of the spring with the same path travelled by the spring. The spring 45 again comprises a bridge portion 46 and two shanks 47 and 48. The ends of both shanks are curved in the shape of a hook. The hook-shaped parts are denoted by 49 and the attached straight parts are denoted by 50.

In FIG. 11, a handle denoted by 51 has a recess 52, 53 for each shank end, the depth of the recesses being stepped. The portion 52 of the recess has a depth which corresponds to the diameter of the spring wire and the portion 53 of the recess has a depth which is substantially twice as deep, in any event so deep that the spring shanks 47, 48 are not prevented from deflecting. The straight parts 50 are held nonrotatably in the portions 52 of the recesses so that at least the parts 49 are stressed by torsion. The length of these parts may be adapted to requirement. In addition, the handle 51 itself corresponds to that shown in FIG. 2.

Having now in detail described and ascertained my said invention and the manner in which the same is to be performed, I declare that what I claim is:

1. In a handle for a container which includes two plates adapted to be welded to the container as carriers for said handle, the plates lying substantially in the fixing direction of the handle, each plate having two oblique edges orientated at an obtuse angle to each other, and at least one spring which, when the handle is pushed onto the carrier plates, is tensioned by means of one of the oblique edges, and which towards the end of the push-on movement comes behind the other edge of the carrier plate and then presses the handle against the container and the carrier plates, the improvement comprised in that the spring consists of a U-shaped steel wire, the handle offering for each shank end of the spring an anchorage which allows the full bending of the spring when the handle is pushed onto the carrier plates, in that the carrier plates engage the bridge of the U-shaped spring, and in that at least one groove is so formed in the handle that the bridge between the shanks of the fully bent spring is engaged with the groove and prevents detachment of the handle from the spring.

2. A handle according to claim 1 wherein at least one projection is formed on the bridge of the spring, the formation engaging with at least one of the grooves in the handle when the spring is fully bent.

3. A handle according to claim 1, wherein the handle is U-shaped and has a bridge which abuts a wall of the container and is parallel to the floor of the container, said U-shaped handle also having a pair of shanks extending from the bridge thereof, a said anchorage being provided in each handle shank for the respective end of the spring, an inner wall of the handle bridge having said grooves for the reception of the bridge of the spring.

4. A handle according to claim 1, wherein the handle is made in the form of a shaft handle in such a way that its longitudinal central plane lies in an axial plane of the container, and wherein the U-shaped spring in the handle is arranged substantially parallel to the central longitudinal plane of the handle.

5. A handle according to claim 4, wherein the two handle-carrying plates are triangular and define substantially parallel planes, said handle-carrying plates being stamped out of one plate in such a way that they are on the same side of the plate and are generally at a right angle thereto.

6. A handle according to claim 1, including one buffer fitted in the handle in such a way that it supports the bridge of the spring at generally the center thereof, said spring bridge being engaged on substantially diametrally opposite sides of its length axis by said handle buffer and said carrier plates, respectively.

7. A handle according to claim 1, wherein said handle is made of plastic.

8. A handle according to claim 1, in which each half of said U-shaped spring has a continuous bending portion, free to bend continuously as a unit without interference with said handle, and extending from said anchored shank end through the remainder of said shank, through a corner portion where said shank joins said bridge of said spring, and through the outer portion of said bridge of said spring.

9. A handle according to claim 8, in which each half of the spring has a further bending portion extending from the center of said spring bridge outward along such spring bridge to said first-mentioned bending portion, said first-mentioned and further bending portions coming together where the corresponding carrier plate engages the bridge of said spring.

10. A handle according to claim 1, in which a given shank end includes a portion substantially parallel to the bridge of the spring, and lying between the shank end anchorage on the handle and the remainder of such spring shank, such that said spring has respective bending stressed and torsion stressed parts, wherein bending of such shank also tends to twist said substantially parallel portion of said shank end.

11. A handle according to claim 1, in which said shank ends of said spring are bent in a hook shape, the bent free extremities of such shank ends being fixedly anchored against rotation with respect to said handle, such that when the spring shanks are bent, at least the hook-shape portions of said spring shanks are torsionally stressed.

* * * * *